US010230744B1

(12) United States Patent
Pandey

(10) Patent No.: US 10,230,744 B1
(45) Date of Patent: Mar. 12, 2019

(54) DETECTING PERIODIC BEHAVIOR IN A COMMUNICATION SESSION USING CLUSTERING

(71) Applicant: EMC IP Holding Company LLC, Hopkinton, MA (US)

(72) Inventor: Sanjiv Pandey, Hayward, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 211 days.

(21) Appl. No.: 15/192,034

(22) Filed: Jun. 24, 2016

(51) Int. Cl.
*G06F 21/57* (2013.01)
*H04L 29/06* (2006.01)

(52) U.S. Cl.
CPC ...... *H04L 63/1416* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 9,516,053 | B1 * | 12/2016 | Muddu | H04L 63/1425 |
| 9,847,924 | B2 * | 12/2017 | Angelov | H04L 63/1425 |
| 2008/0080518 | A1 * | 4/2008 | Hoeflin | H04L 63/1416 |
| | | | | 370/395.42 |
| 2013/0326620 | A1 * | 12/2013 | Merza | H04L 63/1408 |
| | | | | 726/22 |
| 2015/0161394 | A1 * | 6/2015 | Ferragut | G06F 21/577 |
| | | | | 726/25 |
| 2015/0304198 | A1 * | 10/2015 | Angelov | H04L 63/1425 |
| | | | | 709/224 |

OTHER PUBLICATIONS

Perdisci et al. "Behaviroal Clustering of HTTP-Based Malware and Signature Generation Using Malicious Network Traces", In Proceedings of NSDI, '10.*
Pai Swathi, A comparison of Clustering Techniques for Malware Analysis, SJSU Scholar Works, '15.*

(Continued)

*Primary Examiner* — Piotr Poltorak
(74) *Attorney, Agent, or Firm* — Ryan, Mason & Lewis, LLP

(57) ABSTRACT

Methods and apparatus are provided for detecting periodic behavior in a communication session using clustering. An exemplary method comprises obtaining a set of differences between timestamps of adjacent events for a given network session; assigning each difference in the set to a cluster using a clustering technique based on a distance between the difference and a mean time difference for each cluster; and providing clusters generated by the clustering technique, wherein each of the differences in each of the clusters correspond to events exhibiting periodic behavior with a period substantially equal to the mean time difference of the assigned cluster. The differences are optionally obtained and processed in real-time. The periodicity of a given cluster is measured, for example, based on a variance of the differences assigned to the given cluster. The clusters are optionally processed to identify suspicious communications associated with a computer security attack.

20 Claims, 6 Drawing Sheets

(56) References Cited

OTHER PUBLICATIONS

Gonzalez et al., "Malware Classification using Euclidean Distance and Artificial Neural Networks", DOI, 10.1109/MICAI.2013.1, 978-1-4799-2605-3, '13.*
Certh, "Visual Analytic Representation of Large Datasets for Enhancing Network Security. Visual Analytic Representation of Large Datasets for Enhancing Network Security", Seventh Framework Programme, '13.*
Boukhtouta Amine, "On the Generation of Cyber Threat Intelligence: Malware and Network Traffic Analyses", Ph.D.Thesis, Concordia University, '16.*
Cermak Milan, "Utilizing Similarity Search for Advanced Network Threat Detection", Ph.D. Thesis, Masarykova Univerzita, '16.*
Ahmed et al., "Classification of packet contents for malware detection", DOI 10.1007/s11416-011-0156-6, J Comput Virol 7:279-295, '11.*
Asim et al, "Dynamic Monitoring of Composed Services", Proceedigns of Cyberpaterns 2012, DOI: 10.1007/978-3-319-04447-7, p. 17-20, '12.*

\* cited by examiner

300

1. For each d in D:
2. If C is empty or d is more than 3 z-score apart from each existing cluster
3.     create a cluster and put d in that cluster
4. else
5.     c = cluster that gives the minimum Euclidean distance for d from cluster mean value
6.     add d to cluster c

FIG. 3

DETECTING PERIODIC BEHAVIOR IN A COMMUNICATION SESSION USING CLUSTERING

FIELD

The field relates generally to computer security techniques, and more particularly to techniques for identifying suspicious communications associated with computer security attacks, such as malware attacks.

BACKGROUND

Malware (i.e., malicious software) is a common computer security risk. Malware is software used to disrupt computer operations, gather personal and/or sensitive information, and/or gain access to a computing device. Certain malware, upon making their way into a user computing device, such as an enterprise computer, start communicating with a remote host or destination server that commands and controls the malware for the next actions. For example, malware on a given computing device often obtains further instructions to execute on the computing device from a destination server or provides obtained data from the computing device to the destination server.

The communications between the malware and the destination server often arise from within an enterprise environment and are usually periodic in nature, potentially with some randomness to confuse malware detection devices or software from detecting periodicity in the communication pattern.

A need exists for improved techniques for identifying communication sessions that exhibit periodic behavior, such as suspicious communications.

SUMMARY

One or more illustrative embodiments of the present invention provide methods and apparatus for detecting periodic behavior in a communication session using clustering. In one exemplary embodiment of the invention, a method is provided comprising the steps of obtaining a set of differences between timestamps of adjacent events for a given network session; assigning each difference in the set to a cluster using a clustering technique based on a distance between the difference and a mean time difference for each cluster; and providing clusters generated by the clustering technique, wherein each of the differences in each of the clusters correspond to events exhibiting periodic behavior with a period substantially equal to the mean time difference of the assigned cluster.

In one or more embodiments, the differences are obtained and processed in real-time. In at least one embodiment, the periodicity of a given cluster is measured based on a variance of the differences assigned to the given cluster. For example, a smaller variance of the given cluster indicates a higher periodicity of events in the given cluster and a larger variance of the given cluster indicates a lower periodicity of the events in the given cluster.

In one exemplary implementation, the clusters are processed to identify suspicious communications associated with a computer security attack.

The methods and devices of the illustrative embodiments overcome one or more of the problems associated with conventional techniques, and provide clustering-based periodic communication detection techniques to identify periodic communications associated with, for example, potential computer security attacks (e.g., malware attacks). These and other features and advantages of the present invention will become more readily apparent from the accompanying drawings and the following detailed description.

BRIEF DESCRIPTION OF THE DRAWINGS

FIG. 3 illustrates exemplary pseudo code of a clustering-based periodicity detection process, according to one embodiment of the invention;

DETAILED DESCRIPTION

Figure 1:
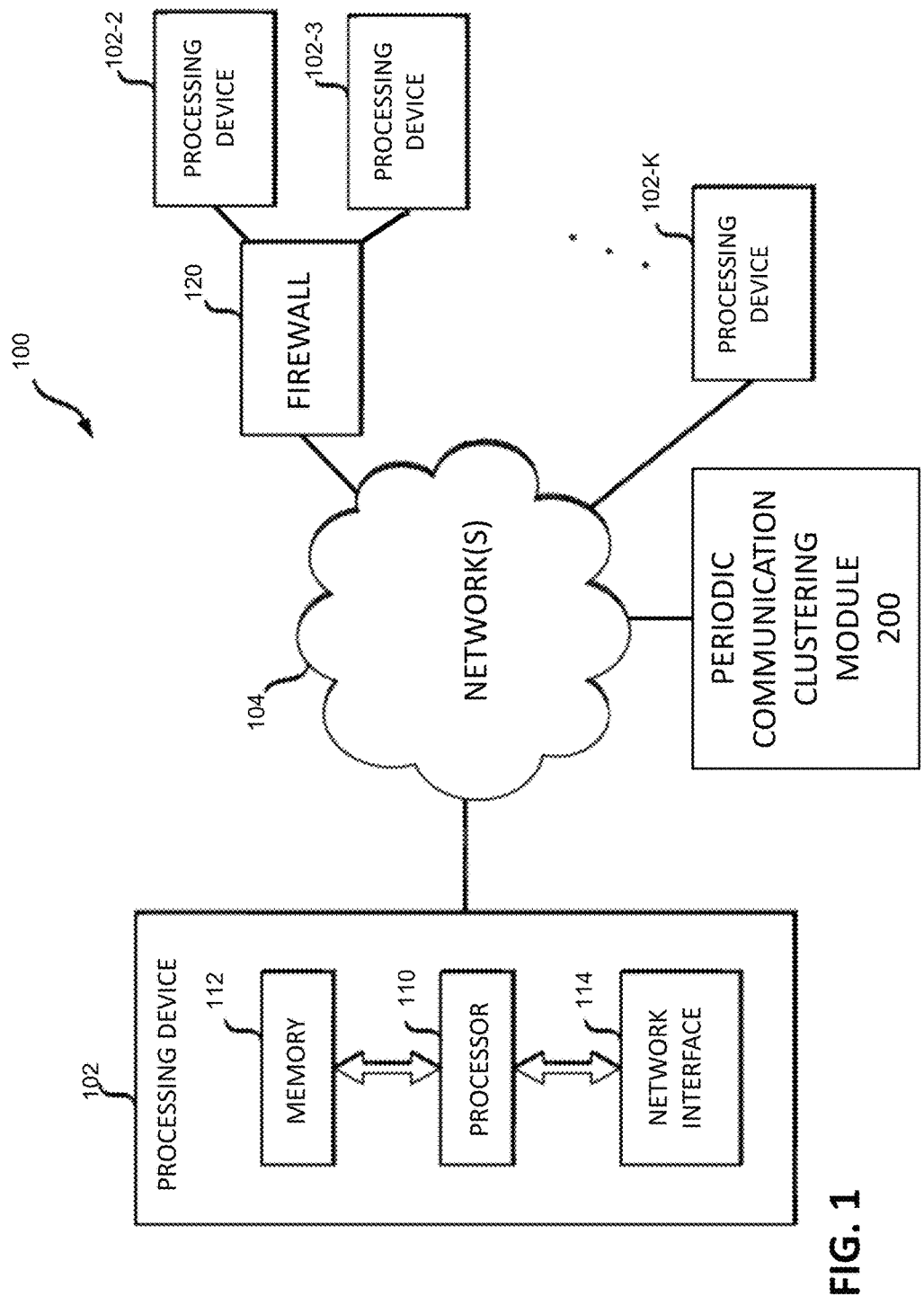
FIG. 1 illustrates an exemplary network environment in which the present invention can be implemented.

Illustrative embodiments of the present invention will be described herein with reference to exemplary communication systems, computing devices, and associated servers, clients and other processing devices. It is to be appreciated, however, that the invention is not restricted to use with the particular illustrative system and device configurations shown.

One or more embodiments of the invention apply a clustering algorithm to identify periodicity in a user/device session to identify potentially suspicious communications. In at least one embodiment, a detection algorithm is provided that identifies pair-wise periodic communications that might be associated with a computer security attack. As used herein, a suspicious domain (also referred to as a malicious domain) comprises a destination server that participates in, or is likely to participate in, computer security attacks, such as malware.

In one or more embodiments, a clustering algorithm is employed to determine periodic behavior of an entity, such as a user or a device. IP (Internet Protocol) addresses, for example, are used to identify devices. An exemplary clustering-based periodic communication detection process identifies periodic pair-wise communications that may be associated with suspicious communications, and provides analysts with an opportunity to further investigate the identified periodic communications. One or more embodiments of the exemplary clustering-based periodic communication detection process identify suspicious domains based on their communication behavior with user computing devices. The exemplary approach is proactive and can identify periodic communications that may be missed by other techniques.

In one exemplary implementation of the invention, periodicity in a user/device communication session is identified in a way that reduces floating-point calculations and thereby provides increased performance.

Autocorrelation is usually performed on the time series with conventional techniques to obtain information about periodicity in the session. Once autocorrelation is performed several complex transforms are applied that are computationally intensive due to lots of exponential function related calculations. The following problems are faced using this approach:

1. A large number of complex floating point calculations are required, incurring a performance hit.
2. A minimum of four samples is needed before autocorrelation and complex transforms can give some result.
3. A maximum number of samples in a session is limited to a low number (around 14) that causes accuracy issues.

In addition, such autocorrelation techniques often exhibit accuracy problems as transforms and jitter kernels may not identify complex periodic sequences, where periodic sequences occur in a burst with some randomness thrown in. Another major problem with the current autocorrelation approach is that if a session contains a periodic sequence with multiple periods, then identifying each period contained in the session is not practical as a user needs to configure different jitter kernels based on the expected interval of period (milliseconds vs. hours vs. days). Thus, a user needs to know the period a priori, which is not feasible. Even if a user guesses the period, creating multiple jitter kernels, and doing complex transformations for each configured period puts extra stress on the computing and memory resources of the machine that's running the algorithm.

Among other benefits, the use of the disclosed clustering algorithm to identify periodicity with the disclosed techniques obviates the need to do a large number of complex transforms and application of a normally distributed jitter kernel. This also facilitates identification of multiple periods contained in a session. Malware would usually try to employ multiple periods to avoid the detection of its periodicity by a simple periodicity detector system.

As will be described, the present invention, in one or more illustrative embodiments, provides methods and apparatus for detecting periodic behavior in a communication session using clustering to identify communications that may be associated with, for example, a computer security attack. In one or more exemplary embodiments, network event data is analyzed to extract user/domain pairs that communicate with one another. An exemplary clustering-based periodicity detection process 300, as discussed further below in conjunction with FIG. 3, then identifies periodic pair-wise communications comprising potentially suspicious communications.

In at least one embodiment, a cluster of timestamp differences is created among the samples in a session and the number of periods contained in the session are identified based on the number of clusters.

While the exemplary embodiments of the invention are illustrated in the context of periodic behavior exhibited by malware, the present invention may be implemented to detect any periodic communication behavior of an entity (e.g., an IP address or a Host) over time, as would be apparent to a person of ordinary skill in the art. For example, the disclosed techniques can also be applied to detect underlying periodic behavior of a user using a website or a computing device performing a transaction or some other communications over the Internet.

FIG. 1 illustrates an exemplary network environment 100 in which the present invention can be implemented. As shown in FIG. 1, the exemplary network environment 100 comprises a plurality of processing devices denoted by 102-1 through 102-K that communicate with one another over one or more networks 104. The network 104 may comprise any type of network, such as a WAN, a LAN, a satellite network, an enterprise network, a telephone or cable network, or various portions or combinations of these and other types of networks.

The exemplary processing device 102-1 comprises a processor 110 coupled to a memory 112. The processor 110 may comprise a microprocessor, a microcontroller, an ASIC, an FPGA or other type of processing circuitry, as well as portions or combinations of such circuitry elements, and the memory 112, which may be viewed as an example of a "computer program product" having executable computer program code embodied therein, may comprise RAM, ROM or other types of memory, in any combination.

Also included in the processing device 102-1 is network interface circuitry 114, which is used to interface the processing device with the network 104 and other system components, and may comprise conventional transceivers.

The other processing devices 102-2 through 102-K are assumed to be configured in a manner similar to that shown for processing device 102-1 in FIG. 1.

As shown in FIG. 1, one or more periodic communication clustering modules 200 are provided, as discussed further below in conjunction with FIG. 2. In addition, one or more of the processing devices 102, such as processing device 102-1, may comprise a destination server of a suspicious domain.

One or more of the processing devices 102, such as processing devices 102-2 and 102-3, may be behind a firewall 120 that blocks communications, for example, based on a blacklist. In an enterprise network, enterprise organizations often employ a firewall (or similar network appliance) to restrict network communications for network users to only essential protocols, with the leading one being the Hypertext Transfer Protocol (HTTP). While firewall applications are very effective at blocking or allowing certain types of communications, their ability to detect potential threats inside the allowed protocol is typically limited to signatures and category rule based inspection. With HTTP being extremely popular and used for virtually everything online, it is no surprise that many of the security threats to an organization are from the web, via HTTP.

Thus, one of the most common defense approaches is blocking communications to suspicious domains, for example, using one or more blacklists implemented by one or more firewalls 120. Nonetheless, blacklists are notorious for containing many benign domains (e.g., domains that were malicious years ago) and require a lot of human labor to generate and maintain them. Also, blacklists only contain domains that were manually detected as malicious or suspicious and therefore new malicious or suspicious domains would often not be included in the blacklists 130.

Suspicious domains are often considered a weak link in an attack pattern, since blocking the communication from the enterprise to these domains might terminate the attack, even if valuable data was found on a processing device 102 within the enterprise network and waiting to be delivered to the destination server of the attacker. Therefore, many attackers use several malicious or suspicious domains for backup and robustness.

Organizations that are victims of computer security attacks often aim to identify the attackers and suspicious domains, in an attempt to reduce the business damage, monetary losses and/or damage to the business reputation. Thus, enterprises often employ blacklists to block communications to suspicious domains. The suspiciousness of a domain is typically determined using existing blacklists that are provided by several providers (e.g., Microsoft™, Cisco™, and Checkpoint™). A domain is traditionally marked as malicious, for example, by analyzing malware that communicates with this domain or by signature detection of files downloaded from the site. These methods require human labor, continuous updates, and fail to detect new malicious sites. It is known that even the best domain blacklists contain large amounts of false positives (i.e., benign domains) and therefore cannot be fully trusted, which poses a problem to the security analyst.

In one or more embodiments, a periodic communication clustering module 200 is provided to identify suspicious periodic communications based on their communication behavior. This approach is proactive and designed to identify the risky activity that is likely to be missed by other solutions.

Figure 2:
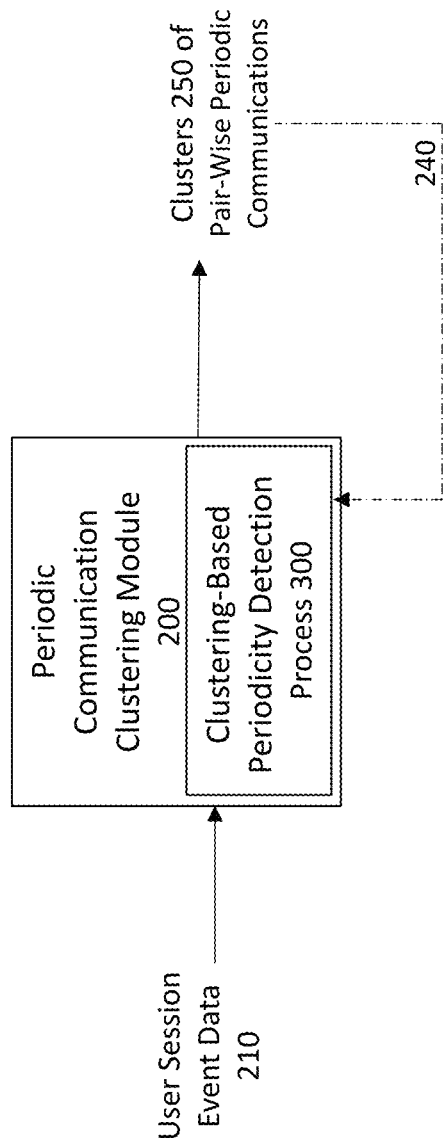
FIG. 2 illustrates an exemplary periodic communication clustering module of FIG. 1 in accordance with one embodiment of the invention.

FIG. 2 illustrates an exemplary implementation of the periodic communication clustering module 200 of FIG. 1 in accordance with one embodiment of the invention. The exemplary periodic communication clustering module 200 may be embodied as any kind of computing device, such as, for example, a personal computer, a workstation, a server, an enterprise server, a laptop computer, a mobile computer, a smart phone, and a tablet computer.

As shown in FIG. 2, the exemplary periodic communication clustering module 200 processes user session event data 210. A user or device session comprises a sequence of events, such as HTTP and HTTPS events. Each event has a timestamp. For a periodicity algorithm, considering a session as a sequence of timestamps of events occurring in that session is a good isolation of the problem. A session is usually a tuple of events, but for the present purpose, a session can be described as a tuple of timestamps as other information in the events is not relevant:

$$S=(t_1, t_2, \ldots, t_n) \quad (1)$$

where $t_i$ is the timestamp of $i^{th}$ event in that session.

Thus, in one or more embodiments, the exemplary user session event data 210 comprises a tuple of timestamps of events occurring during the session.

A time difference $d_{ij}$ between two such timestamps $t_j$ and $t_i$ is defined as follows:

$$d_{ij}=t_j-t_i, \text{ where } i<j \text{ and } 1<i<n-1 \text{ and } 2<j<n \quad (2)$$

For a session containing n timestamp tuples, there are $^nC_2$ numbers of time differences $d_{ij}$, giving a set, D, of time differences, d, for the session, defined as follows:

$$D=\{d\} \quad (3)$$

where d is the time difference obtained from equation (2).

A Minknowski distance, M, between two points $X=(x_1, x_2, x_3, \ldots x_n)$, and $Y=(y_1, y_2, y_3, \ldots y_n)$, is defined as follows:

$$M = \sqrt[p]{\sum_{i=1}^{n} (\text{abs}(x_i - y_i))^p} \quad (4)$$

A Minkowski distance with p equal to two (2) is a special case, referred to as the Euclidean Distance, and is a good measure of distance for creating clusters.

For periodicity detection in accordance with one or more embodiments of the invention, every cluster maintains the mean time difference of the cluster. Generally, the mean time difference of a given cluster is an arithmetic mean of all the time differences, d, contained in that cluster. The mean time difference aids in determining the right cluster for a new element with a given time difference $d_{new}$. The exemplary clustering-based periodicity detection process 300 handles real-time processing challenges, as the entire session might not yet be available and it is still important to find any periodic behavior in malware communications.

For a new time difference $d_{new}$, the exemplary clustering-based periodicity detection process 300 must determine if the new time difference $d_{new}$ is going to one of the existing clusters or if the new time difference $d_{new}$ is going to create a new cluster with itself as the first element in the newly formed cluster. This determination is done by assuming that within a cluster the elements are normally distributed, and hence if a new member whose value is 1 z-score apart, for example, can be considered a cluster of its own.

As shown in FIG. 2, the periodic communication clustering module 200 implements a clustering-based periodicity detection process 300, as discussed further below in conjunction with FIG. 3. The clustering-based periodicity detection process 300 generates clusters 250 of pair-wise periodic communications, corresponding to potentially suspicious communications. The clusters 250 can be used to notify analysts that further investigation of the identified suspicious communications may be required. In this manner, the clusters 250 allow an analyst to evaluate a smaller number of domains or to otherwise prioritize the riskiest domains to investigate. In addition, as shown by the dashed connection 240 in FIG. 2, the clustering-based periodicity detection process 300 is optionally an iterative process that can perform a re-clustering on new data, such as data for a new period of time (e.g., new event data 210 for a recent completed month).

As noted above, the obtained user session event data 210 (e.g., HTTP events) comprises tuples of event timestamps. For example, the Security Analytics™ product, commercially available from RSA Security Inc. of Bedford, Mass., U.S.A. Generally, Security Analytics™ records network traffic of one or more enterprise clients and identifies users by source IP address and domains by destination IP address. In further variations, the user session event data 210 can be obtained using existing sniffer products and/or third party tools, such as IronPort® email and web security gateway and management products, currently referred to as Cisco Email Security and Cisco Web Security, from Cisco, Inc.

FIG. 3 illustrates exemplary pseudo code of a clustering-based periodicity detection process 300, according to one embodiment of the invention. In the exemplary clustering-based periodicity detection process 300, C is a set of clusters and C[i] indicates the statistics for the $i^{th}$ cluster. As shown in FIG. 3, the exemplary clustering-based periodicity detection process 300 processes each time difference, d, in the set, D, of time differences during step 1.

During step 2, the exemplary clustering-based periodicity detection process 300 determines if the set of clusters is empty or if the current time difference, d, is more than 3 z-score apart, for example, from each existing cluster. If the set of clusters is empty or if the current time difference, d, is more than 3 z-score apart, then a new cluster is created during step 3 and the current time difference, d, is placed in the new cluster.

If, however, the set of clusters is not empty or if the current time difference, d, is not more than 3 z-score apart, then the current time difference, d, is placed in the cluster during steps 5 and 6 that gives the minimum Euclidean distance for the current time difference, d, from the cluster mean value.

In at least one embodiment, the z-score for each cluster (referenced in step 2) is determined as follows:

$$\text{z-score for a cluster} = \frac{\bar{d} - \mu}{\sigma},$$

where $\bar{d}$ is a mean of time differences in the cluster, $\mu$ is a sample mean, and $\sigma$ is a sample standard deviation.

While the exemplary embodiment shown in FIG. 3 creates a new cluster when a new time difference has z-score of 3 apart from all of the clusters, a z-score of 2 or even 1 can be used to obtain higher accuracy, at the expense of more clusters and related data management (since for each cluster, sample mean, and standard deviation are maintained).

Once the clusters have been formed by the exemplary clustering-based periodicity detection process 300, each cluster has elements that have time differences that are close enough to be part of the same cluster. One or more aspects of the invention recognize that each cluster can be seen as representing a periodic behavior with a period equal to the mean time difference of all of the elements in that cluster. The variance within each cluster shows the strength of the periodicity in that cluster. A smaller variance means that the time differences in that cluster are smaller and hence indicate a high periodicity. Likewise, a large variance suggests a lower periodicity. Due to this property, variance can be used to measure the periodicity, $P_s$, of a session, S, as follows:

$$P_s = \sum \frac{1}{\sigma_i^2} \text{ over all clusters,} \quad (5)$$

where $\sigma_i$ is the standard deviation for the $i^{th}$ cluster. The inverse of the square of the variance is used in equation (5) to have a minimal contribution from clusters with high variance.

From the measure of periodicity, $P_s$, a periodicity score, $P_{score}$, for a given session among all sessions, in the range of 0 to 100, is calculated as follows:

$$P_{score} = \frac{P_s - P_{s,min}}{P_{s,max} - P_{s,min}} \times 100, \quad (6)$$

where, $P_{s,min}$=minimum value of $P_s$ across all sessions; and
$P_{s,max}$=maximum value of $P_s$ across all sessions.

Figure 4:
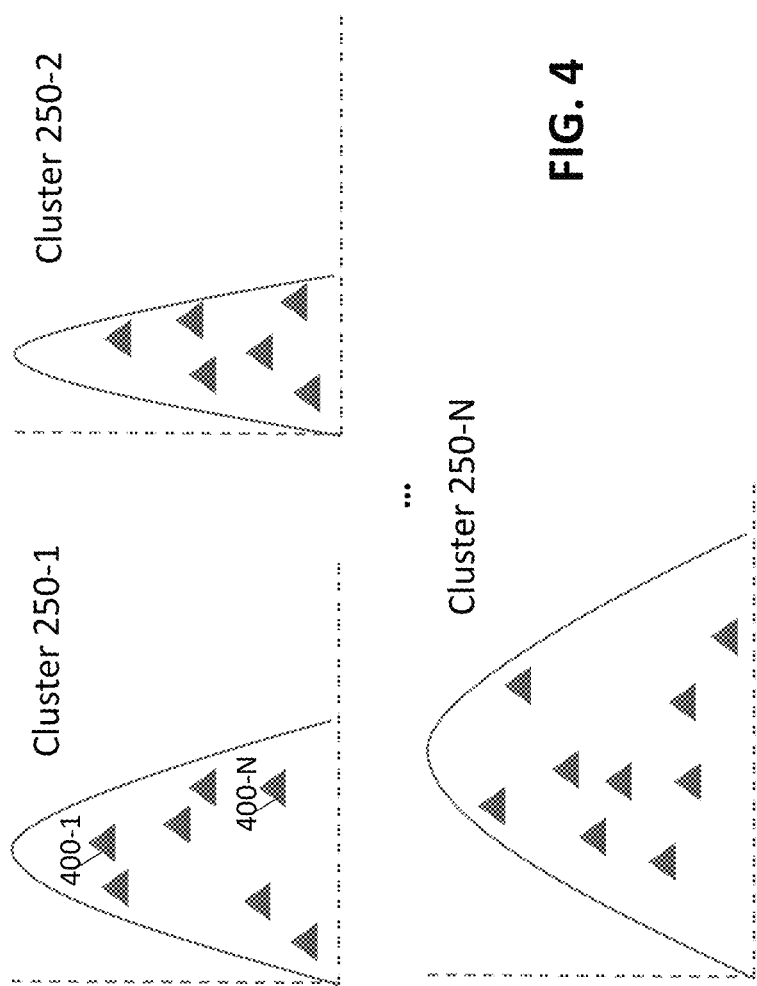
FIG. 4 illustrates an exemplary set of clusters generated by the clustering-based periodicity detection process of FIG. 3.

FIG. 4 illustrates an exemplary set of clusters 250 generated by the clustering-based periodicity detection process 300 of FIG. 3. In the exemplary illustration of FIG. 4, each delta symbol, such as the delta symbols 400-1 through 400-N shown for cluster 250-1, represents a time difference between two events. In a practical implementation there would be many clusters, as would be apparent to a person of ordinary skill in the art, that are dynamically created based on the patterns in the input user session event data 210.

Malware often exhibits periodic behavior when the malware communicates with the command and control server waiting for their next command. In one exemplary use case, the disclosed techniques are used to identify such periodic behavior in real time with high performance, in order to detect malware and secure a computer system. The techniques disclosed herein help to detect and measure periodicity in malware communications.

Among other benefits, one or more embodiments of the invention operate largely without human intervention due to the clustering techniques present in the clustering based periodicity detection process 300 of FIG. 3. One or more exemplary embodiments of the invention allow an organization to focus their response efforts on those suspicious communications that are most likely to be malicious.

Figure 5:
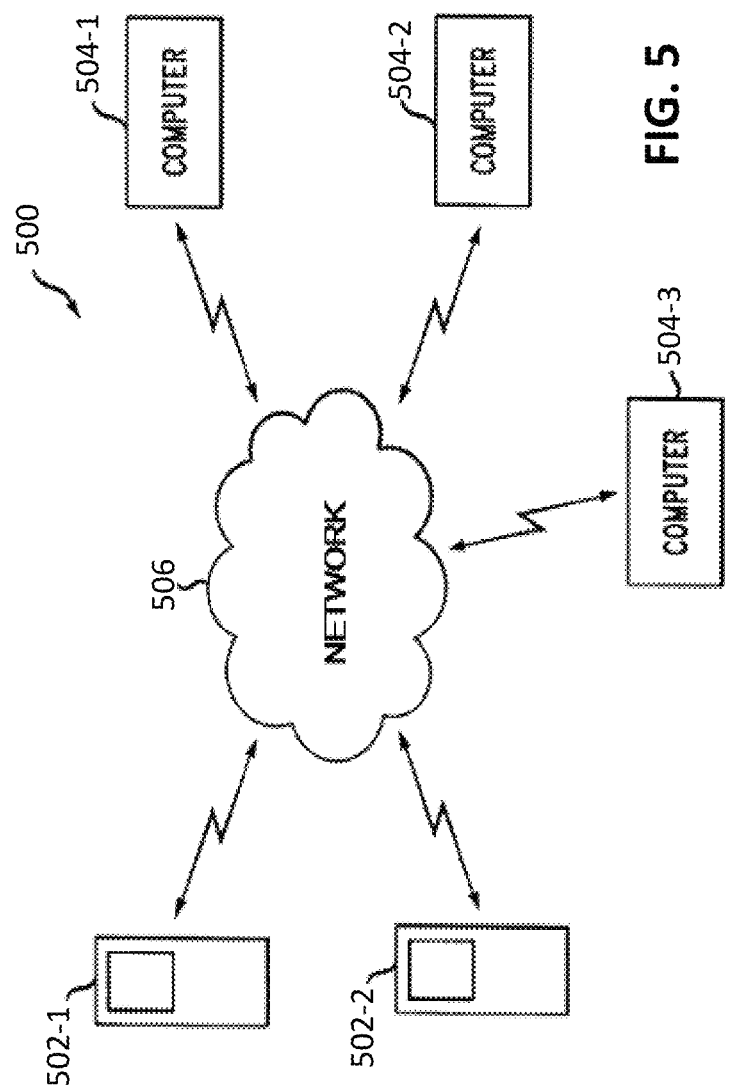
FIG. 5 is a diagram illustrating an example embodiment of communication systems that may incorporate functionality according to one or more embodiments of the invention.

FIG. 5 is a diagram illustrating an example embodiment of communication systems that may incorporate functionality according to one or more embodiments of the invention. As described herein, clustering-based periodic communication detection techniques of the type associated with one or more embodiments of the invention may be implemented in a wide variety of different applications. By way merely of illustration, one exemplary communication system application that may incorporate such techniques will now be described with reference to FIG. 5.

As depicted in FIG. 5, a communication system 500 comprises a plurality of mobile devices 502-1 and 502-2 and computers 504-1, 504-2 and 504-3, configured to communicate with one another over a network 506. The periodic communication clustering module 200 in FIGS. 1 and 2, configured to implement at least one embodiment of the invention, as described herein, can evaluate the communications of any two or more of the devices 502 and 504. It is also to be appreciated, however, that the techniques disclosed herein can be implemented in numerous other applications. For example, while FIG. 5 depicts network 506 as a wireless network, it is to be appreciated that one or more embodiments of the invention can be implemented in connection with a wired network.

Further, aspects of the present invention are described herein with reference to flowchart illustrations, communication diagrams and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a special purpose computer or other specialized programmable data processing apparatus to produce a machine, such that the instructions, which execute via the processor of the computer or other specialized programmable data processing apparatus, implement the functions/acts specified in the flowchart and/or block diagram block or blocks.

As further described herein, such computer program instructions may also be stored in a computer readable medium that can direct a computer, or other programmable devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a device to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, communication diagrams and block diagrams in the figures illustrate the architecture, functionality, and operation of possible implementations of systems, methods and computer program products according to various embodiments of the present invention. In this regard, each block in the flowchart, communication diagrams or block diagrams may represent a component, segment, or portion of code, which comprises at least one executable instruction for implementing the specified logical function(s). It should be noted that the functions noted in the block may occur out of the order noted in the figures.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may be referred to herein as a "system."

Figure 6:
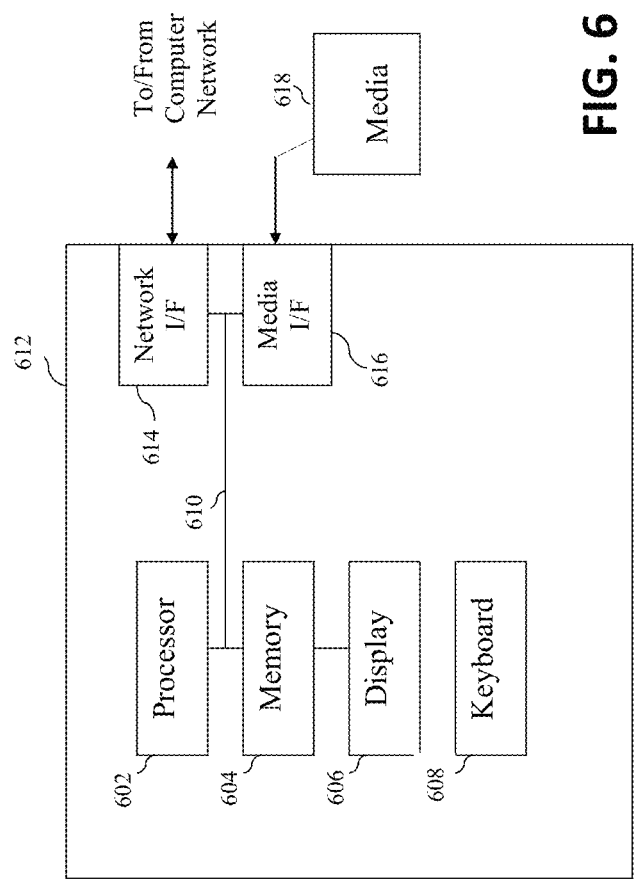
FIG. 6 is a system diagram of an exemplary device on which at least one embodiment of the invention can be implemented.

FIG. 6 is a system diagram of an exemplary device (such as the periodic communication clustering module 200 in FIGS. 1 and 2, for example) on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein can include one of multiple processing device(s), such as, for example, one that includes a central processing unit (CPU), a microprocessor, a microcontroller, an application-specific integrated circuit (ASIC), a field-programmable gate array (FPGA), and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a graphical user interface) and a mechanism for providing results associated with the processing unit (for example, a display).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem, an Ethernet card, etc.) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, multiple combinations of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, steps, operations, elements, and/or components, but do not preclude the presence or addition of another feature, step, operation, element, component, and/or group thereof.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from the disclosed clustering-based periodic communication detection techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   obtaining a set of differences between timestamps of adjacent events for a given network session;
   assigning, using at least one processing device, each difference in said set to a cluster using a clustering technique based on a distance between the difference and a mean time difference for each cluster, wherein the assigning each difference to said cluster further comprises the step of creating a new cluster if the difference is more than a predefined distance from each existing cluster;
   providing a plurality of clusters of network session communications comprising periodic behavior generated by said clustering technique, wherein each of said differences in each of said clusters correspond to events exhibiting periodic behavior with a period substantially equal to the mean time difference of the assigned cluster; and
   identifying potentially suspicious communications associated with a computer security attack by processing said plurality of clusters.

2. The method of claim 1, wherein the distance comprises a Euclidean distance.

3. The method of claim 1, wherein the mean time difference for a given cluster comprises an arithmetic mean of the differences assigned to the given cluster.

4. The method of claim 1, wherein the differences are obtained and processed in real-time.

5. The method of claim 1, wherein the predefined distance from each existing cluster is measured using a z-score.

6. The method of claim 1, further comprising the step of measuring a periodicity of a given cluster based on a variance of the differences assigned to the given cluster.

7. The method of claim 6, wherein a smaller variance of the given cluster indicates a higher periodicity of the given cluster and wherein a larger variance of the given cluster indicates a lower periodicity of the given cluster.

8. A system, comprising:
   a memory; and
   at least one processing device, coupled to the memory, operative to:
   obtaining a set of differences between timestamps of adjacent events for a given network session;
   assigning, using the at least one processing device, each difference in said set to a cluster using a clustering technique based on a distance between the difference and a mean time difference for each cluster, wherein the assigning each difference to said cluster further comprises the step of creating a new cluster if the difference is more than a predefined distance from each existing cluster;
   providing a plurality of clusters of network session communications comprising periodic behavior generated by said clustering technique, wherein each of said differences in each of said clusters correspond to events exhibiting periodic behavior with a period substantially equal to the mean time difference of the assigned cluster; and
   identifying potentially suspicious communications associated with a computer security attack by processing said plurality of clusters.

9. The system of claim 8, wherein the mean time difference for a given cluster comprises an arithmetic mean of the differences assigned to the given cluster.

10. The system of claim 8, wherein the differences are obtained and processed in real-time.

11. The system of claim 8, further comprising the step of measuring a periodicity of a given cluster based on a variance of the differences assigned to the given cluster.

12. The system of claim 11, wherein a smaller variance of the given cluster indicates a higher periodicity of the given cluster and wherein a larger variance of the given cluster indicates a lower periodicity of the given cluster.

13. The system of claim 8, wherein the distance comprises a Euclidean distance.

14. The system of claim 8, wherein the predefined distance from each existing cluster is measured using a z-score.

15. A computer program product, comprising a non-transitory machine-readable storage medium having encoded therein executable code of one or more software programs, wherein the one or more software programs when executed by at least one processing device perform the following steps:
   obtaining a set of differences between timestamps of adjacent events for a given network session;
   assigning, using the at least one processing device, each difference in said set to a cluster using a clustering technique based on a distance between the difference and a mean time difference for each cluster, wherein the assigning each difference to said cluster further comprises the step of creating a new cluster if the difference is more than a predefined distance from each existing cluster;

providing a plurality of clusters of network session communications comprising periodic behavior generated by said clustering technique, wherein each of said differences in each of said clusters correspond to events exhibiting periodic behavior with a period substantially equal to the mean time difference of the assigned cluster; and identifying potentially suspicious communications associated with a computer security attack by processing said plurality of clusters.

16. The computer program product of claim 15, wherein the differences are obtained and processed in real-time.

17. The computer program product of claim 15, further comprising the step of measuring a periodicity of a given cluster based on a variance of the differences assigned to the given cluster.

18. The computer program product of claim 17, wherein a smaller variance of the given cluster indicates a higher periodicity of the given cluster and wherein a larger variance of the given cluster indicates a lower periodicity of the given cluster.

19. The computer program product of claim 15, wherein the mean time difference for a given cluster comprises an arithmetic mean of the differences assigned to the given cluster.

20. The computer program product of claim 15, wherein the predefined distance from each existing cluster is measured using a z-score.

* * * * *